US008169658B2

(12) United States Patent
Saito

(10) Patent No.: US 8,169,658 B2
(45) Date of Patent: May 1, 2012

(54) PRINTING APPARATUS FOR PREVENTING PAPER CURL

(75) Inventor: Akira Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 560 days.

(21) Appl. No.: 12/378,335

(22) Filed: Feb. 13, 2009

(65) Prior Publication Data

US 2009/0201523 A1 Aug. 13, 2009

(30) Foreign Application Priority Data

Feb. 13, 2008 (JP) ................................ 2008-031434
Feb. 13, 2008 (JP) ................................ 2008-031435
Jan. 5, 2009 (JP) ................................ 2009-000065

(51) Int. Cl.
*G06F 15/00* (2006.01)

(52) U.S. Cl. ........ 358/1.8; 358/1.2; 358/1.12; 358/1.18; 347/14; 347/16; 347/19; 347/23; 347/40

(58) Field of Classification Search ........................ None
See application file for complete search history.

(56) References Cited

U.S. PATENT DOCUMENTS

| | | | | |
|---|---|---|---|---|
| 6,692,097 | B2 * | 2/2004 | Arima et al. | 347/15 |
| 6,793,320 | B2 * | 9/2004 | Iwasaki et al. | 347/41 |
| 6,848,765 | B1 * | 2/2005 | Cleveland | 347/16 |
| 6,935,715 | B2 * | 8/2005 | Bates et al. | 347/16 |
| 6,963,423 | B2 * | 11/2005 | Ogasahara et al. | 358/1.8 |
| 7,125,092 | B2 * | 10/2006 | Ouchi | 347/16 |
| 7,173,734 | B2 * | 2/2007 | Klassen et al. | 358/1.9 |
| 7,360,857 | B2 * | 4/2008 | Koshikawa | 347/16 |
| 7,413,361 | B2 * | 8/2008 | Kawaguchi | 400/636 |
| 7,660,544 | B2 * | 2/2010 | Fujita et al. | 399/85 |
| 7,771,036 | B2 * | 8/2010 | Ono | 347/96 |
| 7,782,492 | B2 * | 8/2010 | Seko | 358/2.1 |
| 7,896,459 | B2 * | 3/2011 | Sano et al. | 347/16 |
| 2003/0035021 | A1 * | 2/2003 | Masuyama et al. | 347/40 |
| 2005/0105110 | A1 * | 5/2005 | Katsuyama | 358/1.9 |
| 2007/0002095 | A1 * | 1/2007 | Ozawa et al. | 347/37 |

FOREIGN PATENT DOCUMENTS

| | | | |
|---|---|---|---|
| JP | 06-198865 | | 7/1994 |
| JP | 2005-035100 | * | 2/2005 |

* cited by examiner

*Primary Examiner* — King Poon
*Assistant Examiner* — Dung Tran
(74) *Attorney, Agent, or Firm* — Nutter McClennen & Fish LLP; John J. Penny, V.; Christopher J. Stow

(57) ABSTRACT

A printing apparatus includes: an image data acquiring unit which acquires image data representing an image of a print target; a print data generating unit which on the basis of the image data generates print data for forming the image by allowing an ink head to perform scanning and record ink in a specific edge of a print medium more times than in a portion other than the specific edge; and a print control unit which performs printing on the image on the basis of the print data by controlling the ink head.

8 Claims, 8 Drawing Sheets

PRINTING APPARATUS FOR PREVENTING PAPER CURL

BACKGROUND

1. Technical Field

The present invention relates to a printing apparatus, a printing method, a program capable of preventing a failure in transporting a print medium.

2. Related Art

In the past, a technique was known in which in order to prevent sheet curl which may cause a failure in transporting a print medium, preliminary transmission of main scanning is performed by a print head after performing printing in the front end and the rear end of a print medium, and the print medium is transported after drying ink recorded in the print medium by the preliminary transmission (for example, see JP-A-6-198865).

However, the known technique has a problem in that the failure in transporting the print medium which is caused due to deformation in the print medium cannot be surely prevented. That is, the deformation such as curl in the print medium occurs, since the ink recorded in the print medium soaks into the print medium and fiber binding of the print medium is thus destroyed. Accordingly, when a predetermined amount or more of ink is recorded in the print medium in a short time, it is difficult to prevent the ink from soaking and prevent the deformation in the print medium. In the known technique, dryness is accelerated by performing the preliminary transmission of the print head after the printing. However, since ink is recorded at a normal record speed before the preliminary transmission, the ink can be recorded in the print medium in a short time. Accordingly, in the known technique, since it is difficult to thoroughly solve the cause of the deformation in the print medium, the deformation in the print medium cannot be surely prevented.

SUMMARY

An advantage of some aspects of the invention is that it provides a printing apparatus, a printing method, a program capable of surely preventing a failure in transporting a print medium.

According to an aspect of the invention, print data for forming an image by allowing an ink head to perform scanning and record ink in a specific edge of a print medium more times than in a portion other than the specific edge are generated, and printing is performed on the basis of the print data. That is, the printing is performed so that an amount of ink recorded per unit time in a unit area of the specific edge is smaller than a mount of ink recorded per unit time in a unit area of the portion other than the specific edge.

With such a configuration, in the specific edge, a time interval until another ink droplet is recorded after the ink droplet recorded in a pixel can be made longer than a time interval in the portion other than the specific edge. Accordingly, since the ink recorded on the print medium is dried before the ink excessively soaks into the print medium, the image can be formed while permitting the ink in the specific edge to be dried. In consequence, in the specific edge of the print medium, it is possible to form the image without deformation which is a cause of a failure in transporting the print medium.

Here, an image data acquiring unit acquires image data representing an image of a print target for the print medium. The image data acquires data subjected to a so-called halftone process of defining an amount of ink used in each pixel or acquires data which is not subjected to the halftone process. In the former case, a print data generating unit generates the print data by rearranging the data subjected to the halftone process. Alternatively, in the latter case, the print data generating unit generates the print data by sequentially rearranging the data of pixels to be printed, as well as performing a halftone process.

The print data generating unit generates the print data for forming the image by different methods in the specific edge and the portion other than the specific edge. The print data are generated so that the image is formed by allowing the ink head to perform the scanning and record the ink in the specific edge more times than in the portion other than the specific edge. That is, it takes longer time to record the ink in the specific edge than in the portion other than the specific edge. In this way, the ink recorded during the ink recording is sequentially dried in the specific edge.

Various configurations in which the ink head performs the scanning and record the ink in the specific edge more times than in the portion other than the specific edge can be employed. For example, in the specific edge, the image is formed by a record method in which an ink record density is lower in one-time scanning of the ink head in the specific edge than in the portion other than the specific edge. In addition, a time interval for forming an image of a unit area in the specific edge of the print medium is set to be longer than a time interval in the portion other than the specific edge. In addition, the ink may not be recorded in adjacent pixels in one-time scanning of the ink head and the ink may be recorded in the adjacent pixels during another scanning.

The print data is configured so that the printing is performed by controlling the ink head in accordance with the print data and may be data defining a use amount of ink (existence and nonexistence of ink record or an amount of ink per ink droplet) in order of recording the ink in accordance with a record method (defining the number of main scanning of the ink head which is necessary to complete one-line record, a scanning method (single direction scanning or two-way direction scanning), the number of lines included in a unit print area, the number of lines in which the ink is recorded in one-time main scanning, a transport distance of the sub-scanning, or the like). The print data are data defining an amount of each use ink used in the printing apparatus. In addition, the print data are set so that the deformation in the print medium is prevented and thus the ink is restrained from soaking into the specific edge of the print medium by configuring so that the different record methods are respectively used in the specific edge and the portion other than the specific edge for at least each color.

The specific edge is an edge of the print medium as a target for preventing the deformation in the print medium and an area having a length defined in advance from a side of the print medium is defined as the specific edge. Of course, the size of the specific edge may be changed in accordance with the image data, for example, an amount of ink necessary to form an image presented by the image data. A boundary between the specific edge and the portion other than the specific edge can be precisely defined, but may be configured so that the number of scanning necessary to record the ink is gradually changed from the portion other than the specific edge to the specific edge.

A print control unit prints an image by controlling the ink head in accordance with the print data. The print control unit can eject ink corresponding to the print data at predetermined timing based on the record method by allowing the ink head to perform scanning in accordance with the record method.

As a configuration for surely solving the cause of the failure in transporting the print medium by forming an image without the deformation in the above-described specific edge of the print medium, a configuration in which the cause of the transport failure can be solved when the print medium is transported in both-side printing can be used. For example, in a configuration in which the printing apparatus includes a print medium reversing unit, the specific edge may be an area having a predetermined length from a side which is a lead side of the print medium upon transporting the print medium to the print medium reversing unit included in the printing apparatus.

That is, when the print medium is deformed near the lead side upon transporting the print medium toward rollers in order to transport the print medium by use of the rollers or the like of the print medium reversing unit, the deformation is the cause of the transport failure. Accordingly, when the area having the predetermined length from the side which is the lead side upon transporting the print medium is set to the specific edge, the deformation in the specific edge of the print medium can be prevented in the area, thereby preventing the transport failure.

The predetermined length may be a distance between a first roller for transporting the print medium in the print medium reversing unit and a second roller for transporting the print medium toward the first roller. In the printing apparatus including the rollers for transporting the print medium at plural locations, the rollers are a mechanism which interposes the print medium to transport the print medium. In a configuration in which the printing apparatus includes the first roller (which is transport roller closest to an entrance to which the print medium is carried in the print medium reversing unit and a transport roller sending or guiding the side which is the lead side upon the transporting the print medium into the print medium reversing unit) for transporting the print medium into the print medium reversing unit, it is necessary to supply the print medium to the first roller in a state where the print medium is not deformed (a state where the rigidity is maintained) in order to transport the print medium without the transport failure.

In order to exactly interpose the print medium by the first roller, it is necessary to pass the print medium from another roller (the second roller) to the first roller in the state where the print medium is not deformed. Accordingly, in order to transport the print medium and insert the print medium into the print medium reversing unit without occurrence of the transport failure, the print medium does may not be deformed between the second roller and the first roller. By configuring the specific edge as the area having the predetermined length from the side of the print medium and setting the distance between the first roller and the second roller to the predetermined length, the transport failure can be surely prevented by configuration in which the print medium is transported into the print medium reversing unit by the first roller.

The distance between the first roller and the second roller is defined as a length along a transport passage. When the transport passage is curved (for example, an inclined surface is present), the distance is not defined as a straight line between the first roller and the second roller, but as a distance along the curved transport passage. Of course, the first roller and the second roller can also serve as various functions in the transport passage. For example, when the second roller has a function of transporting the print medium to a discharge unit, the print medium can be transported toward the first roller by reversely rotating the second roller in the both-side printing.

A configuration for more reliably preventing the deformation in the print medium may be combined. For example, the image is formed by allowing an upper limit of the amount of ink used per unit area to be smaller in the specific edge than in the portion other than the specific edge. That is, in a general printing apparatus, the upper limit (ink duty limit) of the amount of ink used per unit area is set. Therefore, it s possible to more reliably prevent the deformation in the print medium in the specific edge, by allowing the upper limit to be smaller and generating the print data.

The upper limit of the use amount of ink in the specific edge can be set as a value for preventing the deformation in the print medium not to create the transport failure. Here, the amount of ink used per unit area in the specific edge can be prevented. In addition, various configurations such as a configuration of reducing the use amount of ink on the whole can be used in addition to configuration of allowing the upper limit of the use amount of ink to be smaller.

The print data generating unit may generate the print data by rearranging the print order of each pixel in accordance with the record method. For example, the image data acquired by the image data acquiring unit are data subjected to the so-called halftone process of defining an amount of ink used in each pixel in a sequence for recording the ink in the pixels. In addition, the print data generating unit may generate the print data by changing the ink record sequence for pixels corresponding to the specific edge on the basis of the data subjected to the halftone process.

With such a configuration, it is possible to generate the print data so that the ink head performs the scanning and records the ink in the specific edge more times than in the portion other than the specific edge, just by generating the data for forming the image and then correcting the data for the specific edge. Accordingly, when various kinds of conversion performed to complete the printing end, the print data according to the invention can be generated. Accordingly, most of the configuration of a known printing apparatus, for example, most of the configuration such as a printer driver for controlling the printing apparatus and a firmware configuration embedded in the printing apparatus can be employed. Therefore, the control according to the invention can be performed by adding a very small-scale configuration.

When an ink record ratio of ink recorded in the specific edge of the print medium exceeds a predetermined threshold value, the printing is performed on the basis of the print data by generating the print data for forming the image in such a manner that the ink head performs scanning and records ink in the specific edge of the print medium more times than in the portion other than the specific edge. That is, when the ink record ratio of ink recorded in the specific edge is larger than a predetermined reference, the printing is performed by allowing an amount of ink recorded per unit time in a unit area in the specific edge to be smaller than an amount of ink recorded per time unit in the unit area in the portion other than the specific edge. With such a configuration, it is possible to form the image while drying the ink, even when the ink record ratio of ink recorded in the specific edge is larger than the predetermined reference.

In consequence, the process of preventing the deformation in the print medium can be performed, when the process of preventing the deformation in the print medium is necessary. Alternatively, it is possible to prevent print time from being unnecessarily longer by not performing the process of preventing the deformation in the print medium in the specific edge, when the ink record ratio of ink recorded in the specific edge of the print medium does not exceed the predetermined threshold value. Moreover, an ink record ratio determining unit easily determines the ink record ratio, when the data subjected to the so-called halftone process defining the amount of ink used in each pixel are acquired as the image data.

The ink record ratio determining unit may determine whether the ink record ratio of ink recorded in the specific edge of the print medium exceeds a predetermined threshold value. That is, the ink record ratio determining unit may determine whether the ink record ratio is a record ratio causing the deformation in the print medium by comparing the ink record ratio in the specific edge to the predetermined threshold value.

Of course, the size of the specific edge may be determined on the basis of the distance between the transport rollers or determined on the basis of the image data such as an amount of ink necessary to form an image represented by the image data or the ink record ratio. In addition, the boundary between the specific edge and the portion other than the specific edge can be precisely defined, but may be configured so that the number of scanning necessary to record the ink is gradually changed from the portion other than the specific edge to the specific edge.

The ink record ratio may represent a ratio of the ink recorded in a reference area of an ink recordable area. Accordingly, the ink record ratio can be represented by a ratio removing the amount of ink with the maximum amount of ink recorded in the unit area, the area of ink recorded per unit area, or the number of pixels recorded with ink per predetermined number of pixels. The threshold value determined in advance for the ink record ratio is an index for determining whether the deformation in the print medium occurs. For example, the ink record ratio at which the deformation in the print medium occurs is statistically obtained to set the acquired value to the threshold value. Of course, the threshold value may be different in each print medium or in each record method.

The print data generating unit may generate the print data so that the image is formed by allowing the ink head to perform the scanning and record the ink in the specific edge more times than in the portion other than the specific edge, when the ink record ratio in the specific edge exceeds the predetermined threshold value. That is, the record method may be changed in accordance with the ink record ratio by generating the print data for forming the image by different record methods in the specific edge and the portion other than the specific edge, respectively. In addition, the ink recorded in the ink recording process is sequentially dried in the specific edge by taking longer time in the specific edge than in the portion other than the specific edge to complete the ink recording.

The print control unit may print the image by controlling the ink head on the basis of the print data. The amount of ink according to the print data can be ejected at predetermined timing according to the record method by allowing the ink head to perform the scanning in accordance with the record method.

The ink record ratio determining unit described above may determine whether the process of preventing the deformation in the print medium is performed by comparing the ink record ratio in the specific edge to the threshold value. In addition, various aspects can be employed as the area of a target for determining the ink record ratio or the threshold value.

For example, as an area included in the specific edge, an area having a predetermined length in the direction perpendicular to the transport direction of the print medium may be employed as the area of the target for determining the ink record ratio. With such a configuration, it is possible to determine whether the deformation in the print medium occurs in the area having the predetermined length in the direction perpendicular to the transport direction of the print medium in the specific edge. The predetermined length is set as a length in the direction perpendicular to the transport direction of the print medium. For example, the predetermined length may be a length of the entire scanning range in the direction perpendicular to the transport direction of the print medium or a substantially scanning range (an area excluding pixels in which the ink is not recorded in both ends of the scanning range) in the direction perpendicular to the transport direction of the print medium.

The scanning range in the print medium is a range in which a relative relation between the ink head and the print medium varies in a state where the ink head can record ink. In a general printing apparatus which performs the main scanning in which the ink head moves in a direction perpendicular to the transport direction of the print medium and the sub-scanning in which the print medium is transported, a range in the print medium on which the ink is recordable by the main scanning and the sub-scanning is the scanning range. In the area of the target for determining the ink record ratio, a length in the direction perpendicular to the transport direction of the print medium is at least defined and a range in a direction parallel to the transport direction of the print medium is arbitrary. For example, the area is an area corresponding to one line in the direction parallel to the transport direction of the print medium or an area corresponding to plural lines.

Areas formed by dividing the scanning range in the specific edge in the direction perpendicular to the transport direction of the print medium may be set as the area of the target for determining the ink record ratio. That is, regional deformation in the print medium may be a cause of the transport failure. Accordingly, in order to evaluate a regional ink record ratio in the specific edge, the scanning range is divided in the direction perpendicular to the transport direction of the print medium and the ink record ratio in each of the areas formed by dividing the scanning range is compared to a predetermined threshold value which is set in advance for each of the divided areas. With such a configuration, it is possible to determine whether the regional ink record ratio is a record ratio at which the regional deformation in the print medium occurs.

Each of the areas formed by dividing the scanning range in the direction perpendicular to the transport direction of the print medium may correspond to an area where the regional deformation in the print medium has to be prevented. The scanning range may be divided equally or unequally. As the scanning range is divided into more areas, the possibility that the deformation in the print medium occurs can be examined in more detail. The ink record ratio is compared to the threshold value in at least one of the divided areas. For example, by dividing the scanning range into four areas in the direction perpendicular to the transport direction of the print medium, the ink record ratio may be compared to the threshold value in two divided area on both end portions.

In the configuration in which the scanning range is divided in the direction perpendicular to the transport direction of the print medium, the threshold value may be different in each of the divided areas. For example, in the plural areas formed by dividing the scanning range, the threshold value of the divided area can be a value which becomes smaller as the divided area is closer to an end portion in the direction perpendicular to the transport direction of the print medium. With such a configuration, it is regarded that the deformation in the print medium occurs at the ink record ratio which becomes smaller as the divided area is closer to the end portion in the direction perpendicular to the transport direction of the print medium. Accordingly, it is possible to more reliably prevent the deformation in the area closer to the end portion in the direction perpendicular to the transport direction of the print medium.

Of course, the threshold value may become smaller as the divided area is located in a position serving as an important role of preventing the failure in transporting the print medium. For example, in order to prevent the deformation near the center portion in the direction perpendicular to the transport direction of the print medium, the threshold value is set such that the threshold value becomes smaller as the divided area is closer to the center potion.

In the configuration in which the scanning range in the specific edge is divided in the direction perpendicular to the transport direction of the print medium, the scanning range may be divided so that the divided area becomes smaller as the divided area is closer to the end portion in the direction perpendicular to the transport direction of the print medium. With such a configuration, it is possible to determine whether the deformation in the print medium occurs on the basis of the ink record ratio in the area having the smaller size as the divided area is closer to the end portion in the direction perpendicular to the transport direction of the print medium. Accordingly, the possibility that the deformation in the print medium occurs can be examined in more detail as the divided area is closer to the end portion in the direction perpendicular to the transport direction of the print medium.

Of course, the size of the divided area may become smaller as the divided area is located in the position serving as an important role of preventing the failure in transporting the print medium. For example, in order to prevent the deformation near the center portion in the direction perpendicular to the transport direction of the print medium, the size of the divided area is set such that the size of the divided area becomes smaller as the divided area is closer to the center potion.

The unit of forming the image by allowing the ink head to perform the scanning and record the ink in the specific edge more times than in the portion other than the specific edge is applicable to a program or a method. The printing apparatus, the program, and the method can be realized only as the printing apparatus or by combination of plural apparatuses. The printing apparatus, the program, and the method can be realized according to various aspects. For example, the printing apparatus, the program, and the method according to the invention can be realized by a combination of a computer and a printing apparatus. The modification is possible. For example, parts of the printing apparatus, the program, and the method can be realized by software and hardware. In addition, a record medium of a program controlling the printing apparatus can be realized according to the invention. Of course, the record medium of the program may be a magnetic record medium, a magneto-optical record medium, and any record medium which is developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described as the following order:

1. Configuration of Printing Apparatus, 1-1. Configuration of Print Medium Reversing Unit, 2. Printing Process, 2-1. Example of Print Data, and 3. Other Embodiments.

1. Configuration of Printing Apparatus

Figure 1:
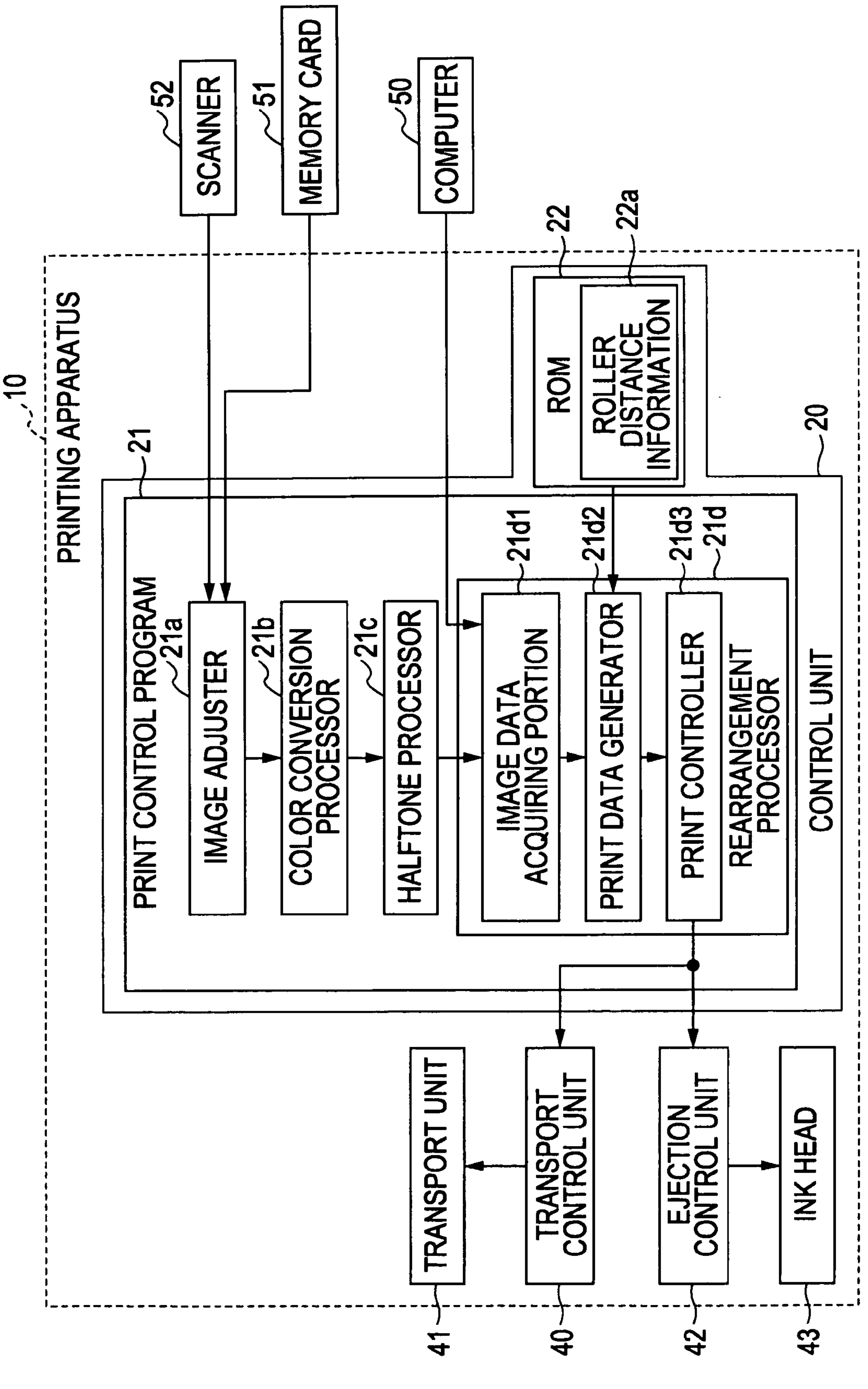
FIG. 1 is a block diagram illustrating the configuration of a printing apparatus.

FIG. 1 is a block diagram illustrating the configuration of a printing apparatus 10 according to the embodiment of the invention. The printing apparatus 10 includes a control unit 20 having a RAM, a ROM, a CPU, and the like and allows the control unit 20 to execute programs stored in a ROM 22. In this embodiment, a print control program 21 as one of the programs can be executed. The print control program 21 includes a function, which is one of functions, of performing printing while preventing deformation in a print medium.

The printing apparatus 10 which includes an interface (not shown) acquires data output through the interface by a computer 50, data stored in a memory card 51, data read by a scanner 52, and the like and prints an image represented by each of these data. The scanner 52 may be integrated with the printing apparatus 10 or may be configured as an individual apparatus. The printing apparatus 10 includes an ink head 43 which can eject ink from plural nozzle rows and reciprocates along a specific direction. An ejection control unit 42 controls ink ejection of the ink head 43 and movement of the ink head 43 in accordance with control instructions output by the control unit 20. The ink head 43 can reciprocate in a direction parallel to the surface of the print medium. In this embodiment, a reciprocating direction of the ink head 43 is a main scanning direction.

The printing apparatus 10 includes a transport unit 41 having a mechanism for transporting a print medium (which is a rectangular print sheet in this embodiment). A transport control unit 40 controls the transport unit 41 to transport the print medium in accordance with a control instruction output by the control unit 20. That is, the transport unit 41 includes plural transport rollers and a structure in which a transport passage of the print medium is formed. The transport control unit 40 controls rotation timing, a rotation direction, an amount of rotation, and the like of the plural transport rollers. Accordingly, the print medium is transported along the transport passage in a state where the print medium is interposed between the plural transport rollers.

Figure 2:
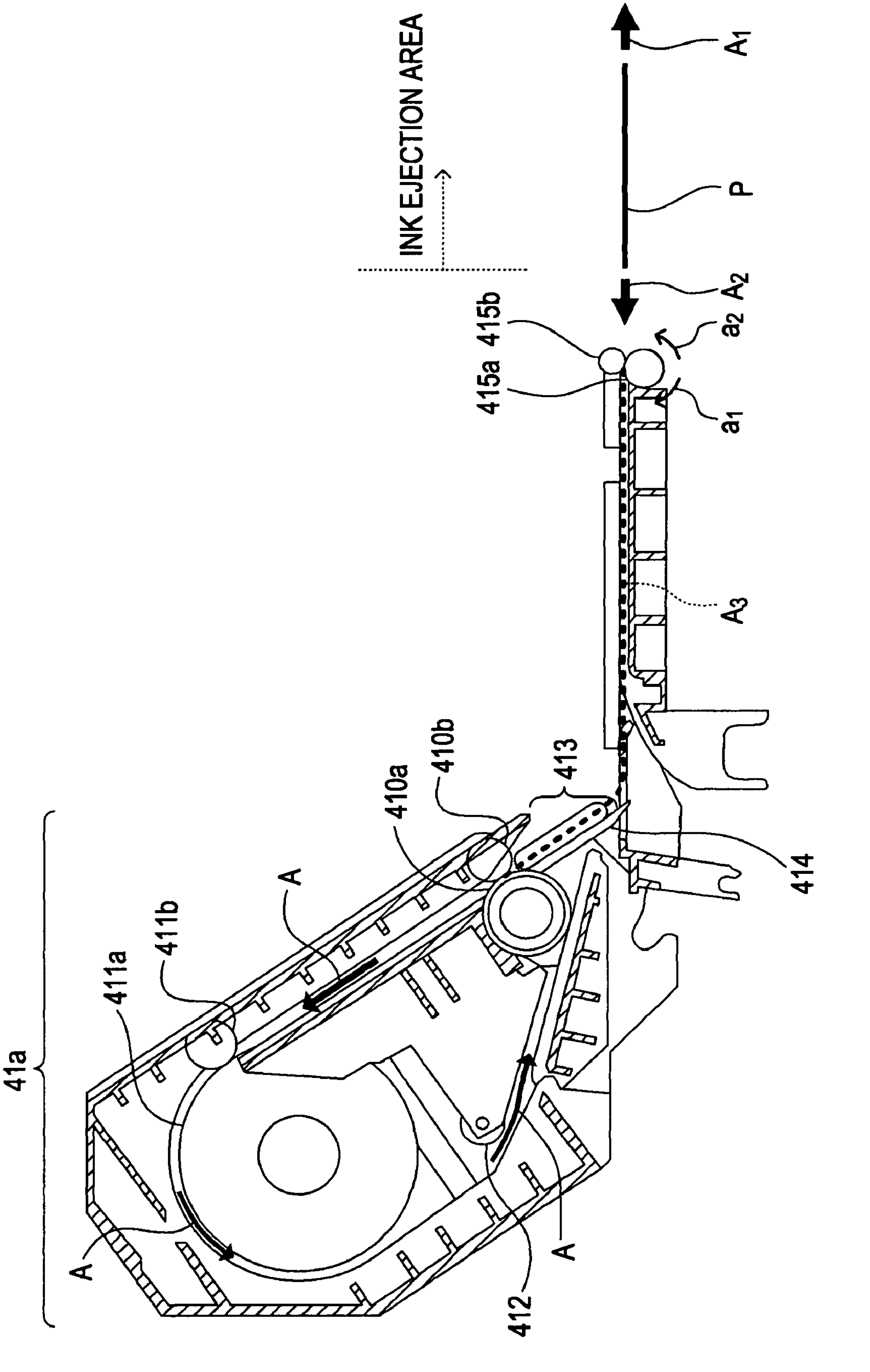
FIG. 2 is a diagram illustrating a print medium reversing unit and peripheral mechanisms.

FIG. 2 schematically shows a print medium reversing unit 41*a*, which is described below, and peripheral mechanisms which are taken along a vertical direction with respect to the surface of the print medium being transported in the transport passage. Transport rollers 415*a* and 415*b* shown in FIG. 2 are configured so that rotation directions thereof can be changed in accordance with an instruction of the transport control unit 40. By forward rotating the transport rollers 415*a* and 415*b*

(in an $a_1$ direction indicated in FIG. 2) with the print medium interposed therebetween, the print medium is transported toward an ink ejection area (which is a right area of the transport rollers 415*a* and 415*b* in FIG. 2) in order (in an Al direction indicated in FIG. 2).

The print medium can be relatively moved toward the ink head 43 while being transported by the transport rollers 415*a* and 415*b*. When the print medium is transported, the ink head 43 is relatively moved in a direction parallel to the surface of the print medium. Accordingly, in this embodiment, the direction in which the print medium is transported by the transport rollers is a sub-scanning direction. In addition, by reversely rotating the transport rollers 415*a* and 415*b* (in an $a_2$ direction indicated in FIG. 2) with the print medium interposed therebetween, the print medium is transported in a reverse direction (an $A_2$ direction indicated in FIG. 2).

In this embodiment, after a front surface of the print medium is subjected to printing in the ink ejection area while forward rotating the transport rollers 415*a* and 415*b* in both-side printing, the print medium is transported toward the print medium reversing unit 41*a* by reversely rotating the transport rollers 415*a* and 415*b*. Subsequently, by allowing the print medium reversing unit to reverse the direction of the print medium and again transporting the reversed print medium toward the ink ejection area by the forward rotation of the transport rollers 415*a* and 415*b*, the rear surface of the print medium is subjected to printing.

1-1. Configuration of Print Medium Reversing Unit

The print medium reversing unit 41*a* has a mechanism for reversing the print medium while transporting the print medium. The outer circumference of the print medium reversing unit 41*a* is formed by a resin case and plural transport rollers are provided inside the case. For example, as shown in FIG. 2, the print medium reversing unit 41*a* includes plural transport rollers 410*a*, 410*b*, 411*a*, and 411*b*. The print medium is transported by rotation of the transport rollers in a state where the print medium is interposed between the transport rollers 410*a* and 410*b* and interposed between the transport rollers 411*a* and 411*b*.

In the print medium reversing unit 41*a* shown in FIG. 2, a passage (which is a passage indicated by an arrow A in FIG. 2) from the transport rollers 410*a* and 410*b* to the transport roller 410*a* through the transport rollers 411*a* and 411*b* and a transport roller 412 is configured as a passage for transporting the print medium. In an opening 413 which serves as an entrance and an exit of the transport passage in the print medium-reversing unit 41*a*, a gate 414 is rotatably supported in the vicinity of the transport rollers 410*a* and 410*b*. Accordingly, by appropriately adjusting a direction by rotational motion of the gate 414, the print medium can be guided into the print medium reversing unit 41*a* and the print medium can be guided outside the print medium reversing unit 41*a*.

With such a configuration, when the print medium in the transport rollers 415*a* and 415*b* is transported toward the opening 413 of the print medium reversing unit 41*a* by the reverse rotation of the transport rollers 415*a* and 415*b* with the print medium interposed therebetween, one side of the rectangular print medium becomes a lead side and the print medium is transported in a direction of the print medium reversing unit 41*a*. Then, when the side of the print medium reaches the gate 414, the lead side of the print medium is guided to the transport rollers 410*a* and 410*b* by the gate 414.

When the lead side of the print medium is interposed between the transport rollers 410*a* and 410*b* to be transported, the print medium is transported along the transport passage inside the print medium reversing unit 41*a* and then discharged outside the print medium reversing unit 41*a*. At this time, the front surface of the print medium is transported downward by the transport rollers 411*a* and 411*b*. Therefore, when the print medium is transported along the transport passage inside the print medium reversing unit 41*a*, the front surface of the print medium which has faced upward before the print medium is transported inside the print medium reversing unit 41*a* faces downward to be discharged. That is, it is possible to reverse the direction of the print medium.

Since the transport rollers 410*a* and 410*b* serve as rollers for transporting the print medium inside the print medium reversing unit 41*a* in this embodiment, the transport rollers 410*a* and 410*b* correspond to a first roller in claims. In addition, the transport rollers 415*a* and 415*b* for transporting the print medium to the transport rollers 410*a* and 410*b* correspond to a second roller in claims.

Figure 3A:
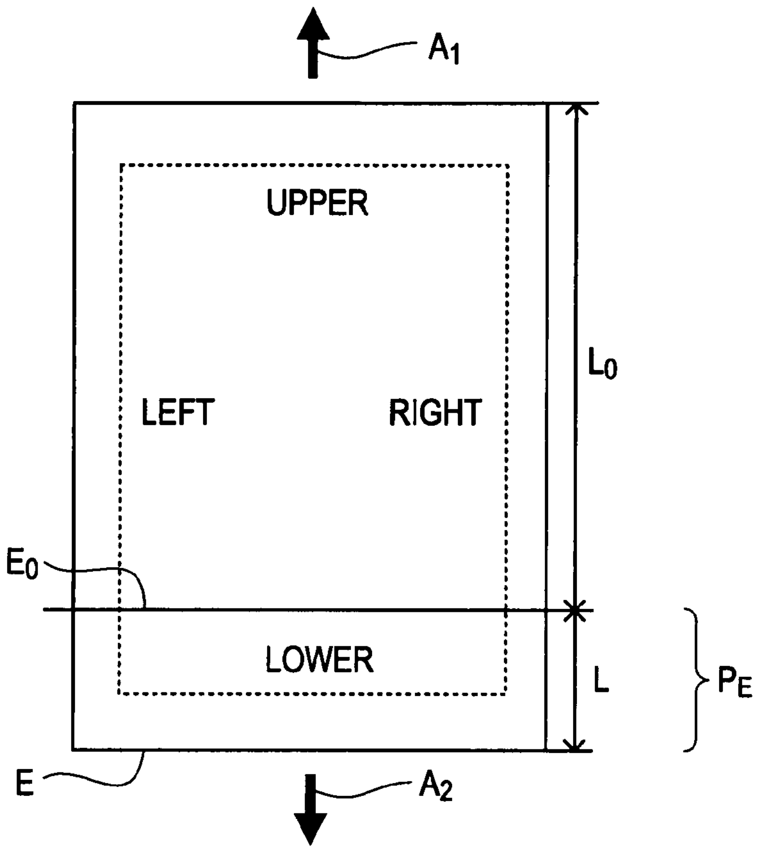
FIGS. 3A to 3C are schematic diagrams illustrating a print medium.
Figure 3B:
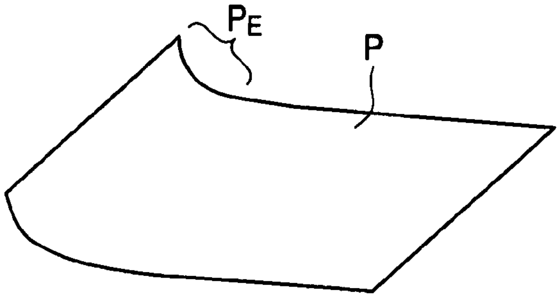
Figure 3C:
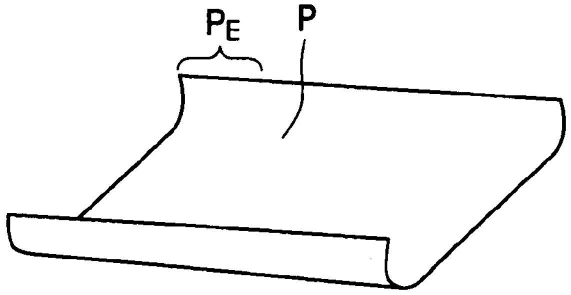

FIGS. 3A to 3C are schematic diagrams illustrating a print medium P. In FIG. 3A, a rectangular shape indicated by a solid line represents four sides of the print medium P and a rectangular shape indicated by a dashed line represents a scanning range on the print medium. FIG. 3A shows correspondence between upper, lower, right, and left portions of the sheet surface of the print medium and upper, lower, right, and left portions of an image of a print target. In this embodiment, printing is performed from the upper portion of the image to the lower portion of the image, while transporting the print medium and performing sub-scanning on the print medium. That is, an arrow $A_1$ indicated in FIG. 3A is the transport direction in which the print medium is transported to an ink record area by forward rotating the transport rollers 415*a* and 415*b*. In addition, an arrow $A_2$ indicated in FIG. 3A is the transport direction in which the print medium is transported by reversely rotating the transport rollers 415*a* and 415*b* or the transport direction in which the print medium is transported by the transport rollers 410*a*, 410*b*, 411*a*, and 411*b*.

In this embodiment, the print medium is transported with the configuration described above. Therefore, when an edge including the side corresponding to the lead side upon transporting the print medium in the direction of the arrow $A_2$ indicated in FIG. 3A is deformed, a transport failure may occur. That is, when a specific edge $P_E$ corresponding to the lead side in the transport direction of the print medium P is curled in FIGS. 3B and 3C, the transport failure may occur. That is because the print medium transported to the transport rollers 415*a* and 415*b* shown in FIG. 2 cannot be exactly inserted between the transport rollers 410*a* and 410*b*.

Accordingly, in order to prevent the deformation such as the curl in the print medium and appropriately transport the print medium, it is configured in this embodiment that the image is formed by allowing the ink head 43 to perform scanning and record ink in the specific edge $P_E$, which causes the transport failure, more times than in a portion other than the specific edge $P_E$.

In this embodiment, a range of a predetermined distance L from a side E corresponding to the lead side in the transport direction of the print medium P is set as the specific edge $P_E$. Therefore, the distance L is equal to a length along the transport passage (which is a passage $A_3$ indicated by a dashed line in FIG. 2) between the transport rollers 415*a* and 415*b* to the transport rollers 410*a* and 410*b*. That is, when the deformation in the print medium does not occur within the transport passage (which is a passage $A_3$ indicated by a dashed line in FIG. 2) between the transport rollers 415*a* and 415*b* to the transport rollers 410*a* and 410*b*, the print medium transported from the transport rollers 415*a* and 415*b* can be exactly inserted between the transport rollers 410*a* and 410*b*. Therefore, the transport failure does not occur.

For that reason, in this embodiment, information on the distance L from the transport rollers 415*a* and 415*b* to the transport rollers 410*a* and 410*b* is recorded in advance as roller distance information 22*a* in the ROM 22. In addition, the printing is performed with reference to the roller distance information 22*a* in printing, while preventing the deformation in the print medium upon designating a print location to the specific edge $P_E$ on the basis of the roller distance information 22*a*.

In this embodiment, the roller distance information 22*a* is also information which defines the distance L from the transport rollers 415*a* and 415*b* to the transport rollers 410*a* and 410*b* by transport unit when the transport rollers 415*a* and 415*b* transport the print medium. Of course, the roller distance information 22*a* may be information representing the distance L from the transport rollers 415*a* and 415*b* to the transport rollers 410*a* and 410*b* and may be expressed by various methods such as expression by an inch and expression by the number of lines corresponding to print resolution.

2. Printing Process

Next, a printing process in the configuration described above will be described. The control unit 20 activates a print control program 21 to print an image in accordance with a print instruction generated by the computer 50, or a print instruction (such as a print instruction of data stored in the memory card 51 or a print instruction of data read in the scanner 52) generated by pressing buttons equipped in the printing apparatus 10. Here, the print instruction contains a print condition such as a both-side printing instruction, a resolution, or the size of a print medium.

The printing is performed by different record methods in the specific edge $P_E$ on the front surface of the print medium and in the portion other than the specific edge $P_E$. In this embodiment, the former method is referred to as dry printing and the latter method is referred to as normal printing. In addition, in order to form an image, the dry printing employs a record method of scanning the ink head 43 and recording ink more times than in the normal printing.

The dry printing and the normal printing are realized such a manner that an image adjuster 21*a*, a color conversion processor 21*b*, a halftone processor 21*c*, and a rearrangement processor 21*d* allow the control unit 20 to perform predetermined processes. In this embodiment, the control unit 20 first generates print data for the normal printing (Step S100).

The image adjuster 21*a* is a module which adjusts an image matching with the print condition. In Step S100, the control unit 20 acquires data representing an image related to a print instruction from the memory card 51 or the scanner 52 by a process of the image adjuster 21*a*. In addition, the control unit 20 performs an interpolation process on the acquired data, if necessary, by the process of the image adjuster 21*a* and generates data representing the number of pixels according to the print resolution from the data.

The color conversion processor 21*b* is a module which converts a color system of the generated data. That is, in this embodiment, the data generated by the image adjuster 21*a* are data expressed by an RGB color system or an YCC color system. The control unit 20 converts the color system of the data expressed by the RGB color system or the YCC color system by the process of the color conversion processor 21*b* into data expressed by an ink color system in which colors of ink are color components.

The halftone processor 21*c* is a module which performs a halftone process on the data subjected to the color conversion. That is, the control unit 20 generates data representing a use amount of ink (presence or non-presence of ink or an amount of ink per ink droplet) in every pixel on the basis of the data subjected to the above-described color conversion by the process of the halftone processor 21*c*. In this embodiment, the data defining the use amount of ink in every pixel correspond to image data (which is image data representing the image of the print target) in claims.

The rearrangement processor 21*d* is a module which generates print data by rearranging the data subjected to the halftone process and performing printing on the basis of the print data. Specifically, the rearrangement processor 21*d* includes modules of an image data acquiring portion 21*d*1, a print data generator 21*d*2, and a print controller 21*d*3. The image data acquiring portion 21*d*1 is a module which acquires image data representing an image of a print target. The control unit 20 acquires the image data processed by the halftone processor 21*c* by a process of the image data acquiring portion 21*d*1. In this embodiment, the computer 50 can execute functions of the image adjuster 21*a*, the color conversion processor 21*b*, and the halftone processor 21*c* described above. Accordingly, when the computer 50 generates a print instruction, the printing apparatus 10 acquires the image data subjected to the halftone by the computer 50 and the rearrangement processor 21*d* acquires the image data subjected to the halftone process by the computer 50.

The print data generator 21*d*2 is a module which generates print data by rearranging the image data in accordance with a record method determined in advance. That is, the record method in each of the normal printing and the dry printing is determined in advance. When the print method is different, an order of pixels of a print target is different. Therefore, the control unit 20 rearranges the image data in the order according to the record method by the process of the print data generator 21*d*2. However, in Step S100 described above, data are rearranged in a use order of the normal printing and used as the print data.

In the normal printing, as described below, the printing is completed in a short time by employing the configuration in which ink is recorded in order of adjacent pixels without forming an interval in grids forming the pixels. However, in the record method of completing the printing in a short time, subsequent ink is recorded before the ink having recorded on the print medium is dried. Therefore, a cause of the transport failure upon transporting the print medium to the print medium reversing unit 41*a* occurs, since the print medium may be deformed.

In order to solve this problem, in this embodiment, the dry printing is performed in which the cause of the failure in transporting the print medium does not occur in the above-described specific edge $P_E$ under a print condition of the printing on the rear surface of the print medium after the front surface is subjected to the printing. Accordingly, by the process of the print data generator 21*d*2, the control unit 20 determines whether the print condition is the both-side printing (Step S105), whether the printing is performed now on the front surface (Step S10), and whether a portion as a present print target is the specific edge $P_E$ (Step S115).

In the determination of Step S115, the control unit 20 acquires the above-described distance L represented by the roller distance information 22*a* with reference to the ROM 22. In addition, the control unit 20 acquires the size (an entire transport distance $P_L$ in the sub-scanning direction) of the print medium being now subjected to the printing. When a print location (the transport distance from a transport start point of the print medium) in the present sub-scanning direction is equal to or less than $P_L$-L, it is determined that the portion as a present print target is the specific edge $P_E$. Of course, a configuration may be employed in which it is determined that a portion as a present print target is the specific edge $P_E$ when an upper end (indicated by $E_0$ in FIG. 3A) of specific edge $P_E$ is included inside the unit print area as the print target.

When it is determined that the print condition is the both-side printing in Step S105, it is determined that the printing is performed now on the front surface in Step S110, and it is determined that the portion as the present print target is the specific edge $P_E$ in Step S115, the dry printing is performed in Steps S120 and S125. Specifically, in Step S120, the control unit 20 performs a rearrangement process on the print data by the process of the print data generator 21*d*2.

That is, the print data generated in Step S100 are data for performing the normal printing corresponding to one page. Since the print data are different from the image data in a use order in the normal printing and the dry printing, as described below, the image data of an image to be printed in the specific edge $P_E$ are acquired and the print data are generated by rearranging the image data in order matching with the print method in the dry printing. When the print data are generated by the rearrangement, the control unit 20 allows the transport control unit 40 and the ejection control unit 42 to perform printing on the basis of the print data in Step S125.

Specifically, the print controller 21*d*3 is a module which prints an image by controlling the ink head 43 on the basis of the print data. The control unit 20 outputs the print data and information on the record method to the ejection control unit 42 by the process of the print controller 21*d*3. When the ejection control unit 42 acquires the print data and the information on the record method, the ejection control unit 42 sequentially ejects ink droplets corresponding to the use amount of ink indicated by the print data toward the pixels, by moving the ink head 43 in accordance with the record method to perform the main scanning.

The control unit 20 also outputs the information on the record method to the transport control unit 40 by the process of the print controller 21*d*3. In consequence, the transport control unit 40 performs the sub-scanning for transporting the print medium, by driving the transport rollers of the transport unit 41 in accordance with the record method. In this embodiment, plural lines parallel in the sub-scanning direction are defined as a unit print area. Therefore, in Step S125, the dry printing is performed in the unit print area in combination with the main scanning and the sub-scanning.

When the dry printing ends in the unit print area, the control unit 20 determines whether the printing in the specific edge $P_E$ by the process of the rearrangement processor 21*d* ends (Step S130). The dry printing in the specific edge $P_E$ of the front surface is repeatedly performed, until it is determined that the printing in the specific edge $P_E$ ends. When it is determined that the printing in the specific edge $P_E$ ends in Step S130, processes subsequent to Step S140 are performed.

Alternatively, when it is determined that the print condition is not the both-side printing in Step S105, it is determined that the printing is not performed now on the front surface in Step S110, or it is determined that the portion as the present print target is not the specific edge $P_E$ in Step S115, the normal printing is performed in Step S135. That is, the printing is performed in the unit print area on the basis of the print data generated in Step S100. Specifically, the control unit 20 outputs the print data and the information on the record method to the ejection control unit 42 and outputs the information on the record method to the transport control unit 40 by the process of the print controller 21*d*3. In consequence, the ejection control unit 42 sequentially ejects ink droplets corresponding to the use amount of ink indicated by the print data onto the pixels by moving the ink head 43 in accordance with the record method to perform the main scanning. In addition, the transport control unit 40 performs the sub-scanning by driving the transport rollers of the transport unit 41 in accordance with the record method.

In this way, when the normal printing in the unit print area ends or the dry printing in the specific edge $P_E$ ends, the control unit 20 determines whether the printing ends (Step S140). That is, the control unit 20 determines whether the both-side printing ends in a case of the both-side printing and determines whether a one-side printing ends in a case of the one-side printing. The processes subsequent to Step S105 are repeatedly performed, until it is determined that the printing ends.

When the printing on the front surface ends during the both-side printing, the control unit 20 reverses the print medium by outputting a control signal to the transport control unit 40 by the process of the print controller 21*d*3 in Step S140. That is, the transport control unit 40 reverses the print medium by reversely rotating the transport rollers 415*a* and 415*b* in the transport unit 41, transporting the print medium into the print medium reversing unit 41*a*, and rotating the transport rollers 410*a*, 410*b*, 411*a*, 411*b*, and the like. The print medium discharged from the print medium reversing unit 41*a* is transported to the transport rollers 415*a* and 415*b*, when the reversing of the print medium ends. Then, the processes subsequent to Step S105 are performed to perform the printing on the rear surface.

According to the processes described above, the printing can be performed while allowing the ink head 43 to perform scanning and record ink in the specific edge $P_E$ Of the front surface of the print medium more times than in the portion other than the specific edge $P_E$. Accordingly, the deformation in the print medium which is caused due to the ink record does not occur in the specific edge $P_E$ of the front surface. Moreover, the distance L from the side E forming the specific edge $P_E$ is equal to the distance L from the transport rollers 415*a* and 415*b* to the transport rollers 410*a* and 410*b*. Accordingly, when the print medium is transported, the deformation in the print medium present between the transport rollers 415*a* and 415*b* and the transport rollers 410*a* and 410*b* does not occur at least and thus the failure in transporting the print medium does not occur.

In this embodiment, just by rearranging the image data subjected to the halftone process, it is possible to generate the print data so that the ink head 43 performs the scanning and records the ink in the specific edge $P_E$ more times than in the portion other than the specific edge $P_E$. Accordingly, when various kinds of conversion (such as the color conversion process and the halftone process) performed to complete the printing end, the print data according to the invention can be generated. Accordingly, most of the configuration of a known printing apparatus, for example, most of a firmware configuration embedded in the printing apparatus 10 can be employed. Therefore, the control according to the invention can be performed by addition of a very small-scale configuration. Of course, most of the configuration of the printer driver can be employed even in the configuration employing the printer deliver for controlling the printing apparatus 10.

2-1. Example of Print Data

Figure 5A:
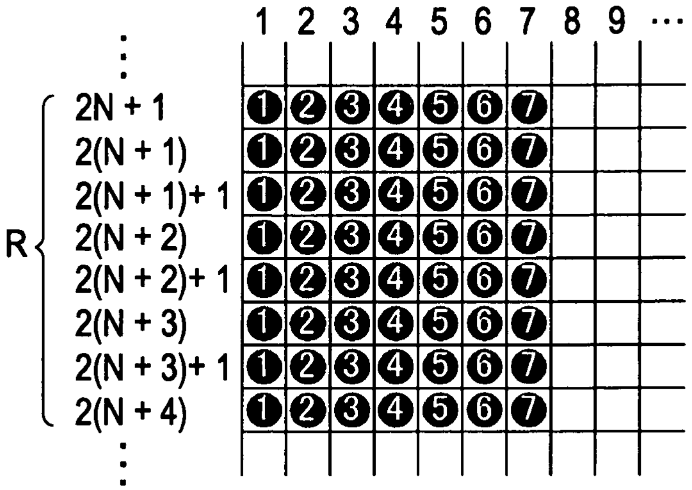
FIGS. 5A to 5E are explanatory diagrams illustrating an ink record sequence.
Figure 5B:
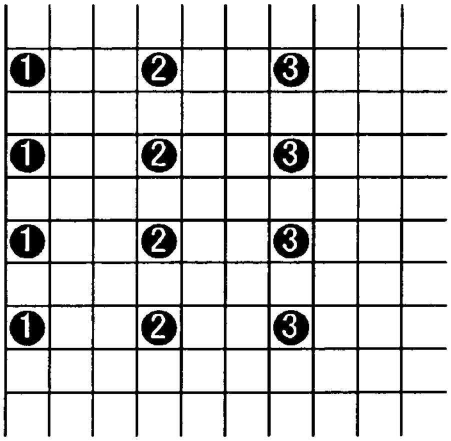
Figure 5C:
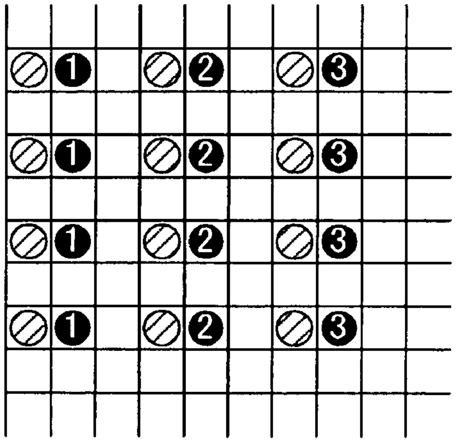
Figure 5D:
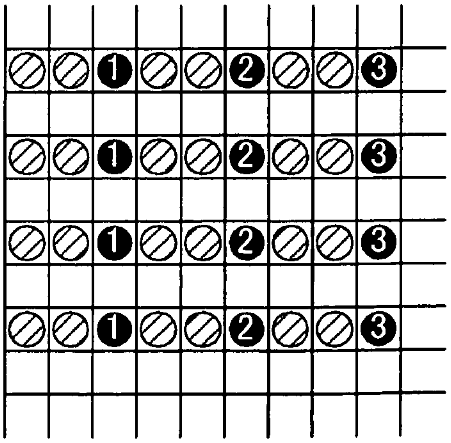
Figure 5E:
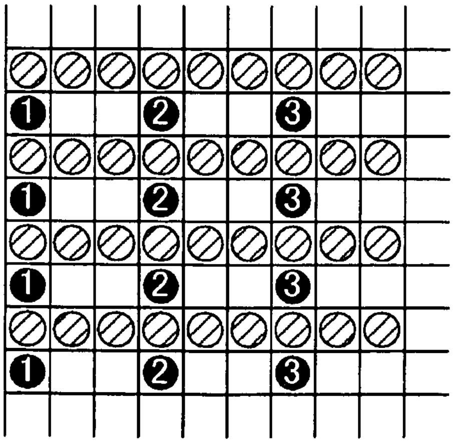

Next, detail examples of the normal printing and the dry printing will be described. FIGS. 5A to 5E are explanatory diagrams illustrating an ink record sequence in the examples of the normal printing and the dry printing. FIG. 5A shows the ink record sequence of the normal printing and FIGS. 5B and 5E show the ink record sequence of the dry printing. In FIGS. 5A to 5E, pixels are indicated by grids in each drawing and an ink droplet recorded in each pixel is indicated by a black circle in the grid. Right and left directions of the drawings are the main scanning direction and upper and lower directions are the sub-scanning direction. In each of the drawings, the pixels parallel in the main scanning direction are shown in the range of numbered pixels (first to ninth pixels) from the left end. In addition, lines parallel in the sub-scanning direction are shown in the range of numbered lines (a 2N+1-th line to a 2(N+4)-th line (where N is 0 or a natural number)) (see FIG. 5A). In each drawing, numbers in the black circles represent the ink record sequence in which the ink is recorded during the main scanning. In the drawings, a state where the ink is recorded in the pixels in accordance with the ink record sequence of the pixels is indicated by the black circles. Of course, pixels in which the ink is not recorded may be present depending on the image data in actual printing.

In this embodiment, it is configured so as to perform the normal printing by the record method of completing the ink record in a short time as soon as possible. Therefore, a record method of recording the ink in the pixels adjacent to each other in the main scanning direction and simultaneously recording the ink in the plural pixels adjacent to each other in the sub-scanning direction is employed. Accordingly, in this embodiment, as shown in FIG. 5A, the ink is recorded sequentially in the plural lines (eight lines in FIG. 5A) parallel in the sub-scanning direction from the left pixel. That is, the ink is completely recorded in the plural adjacent lines (a unit print area R indicated in FIG. 5A) by performing the one-time main scanning. When the one-time main scanning is completed, the sub-scanning is performed to the extent corresponding to the length of the unit print area R in the sub-scanning direction to perform subsequent main scanning.

In this embodiment, since the normal printing is performed by the record method described above, in Step S100, the control unit 20 extracts data of the left-end pixels corresponding to eight lines from the image data subjected to the halftone process and sets the extracted data to initial eight-pixel data, and then extracts data of second pixels corresponding to eight lines from the left end and sets the extracted data to next eight-pixel data to perform rearrangement. The print data of the unit print area R are generated by continuing this process up to the right-end pixels. Then, in Step S100, the control unit 20 generates the print data corresponding to one page used to perform the normal printing by repeatedly performing the process in each unit print area R.

In the normal printing described above, since the ink is recorded sequentially in the adjacent pixels without forming the interval in the grids forming the pixels, the printing can be completed in a short time. However, in the record method of completing the printing in a short time, subsequent ink is recorded before the ink having been recorded on the print medium is dried. Therefore, the deformation in the print medium may occur, thereby creating the cause of the failure in transporting the print medium to the print medium reversing unit 41*a*.

On the other hand, in order to perform the printing corresponding to one line, the dryness can be accelerated by performing the scanning more times in the dry printing than in the normal printing. For example, by performing the main scanning three times in order to perform the printing corresponding to one line, the ink may be recorded in every two pixels in the sub-scanning direction. In this example, the unit print area R shown in FIG. 5A is scanned by total six-time main scanning and one-time sub-scanning, when first main scanning to third main scanning are performed on odd-numbered lines and fourth to sixth main scanning are performed on even-numbered lines.

FIGS. 5B to 5E are diagrams illustrating the main scanning upon performing the printing on the same unit print area R as that in FIG. 5A. FIGS. 5B and 5E show the first main scanning to fourth main scanning, respectively. In each main scanning, the ink is recorded at a ratio of one pixel to three pixels of the pixels parallel in the main scanning direction. In the first main scanning, the ink is recorded sequentially on 1, 4, 7, . . . , 1+3n-th pixels (where n is 0 or a natural number) from the left side, as shown in FIG. 5B.

When the first main scanning ends, the ink head 43 is returned to an initial location and the second main scanning starts. In the second main scanning, the ink is recorded sequentially on 2, 5, 8, . . . , 2+3n-th pixels (where n is 0 or a natural number) from the left side as shown in FIG. 5C. Circles indicated by hatch in FIG. 5C represent the pixels (the 1, 4, 7, . . . , 1+3n-th pixels from the left side) subjected to the ink recording in the first main scanning. When the ink is recorded in the pixels (the 2, 5, 8, 2+3n-th pixels from the left side) adjacent to the above pixels, the ink in the pixels subjected to the ink recording is dried. Therefore, the deformation in the print medium does not occur, even when the ink is recorded in the second main scanning.

Likewise, when the second main scanning ends, the ink head 43 is returned to the initial location to start the third main scanning. In the third main scanning, the ink is recorded sequentially in 3, 6, 9, . . . , 3+3n-th pixels (where n is 0 or a natural number), as shown in FIG. 5D. Circles indicated by hatch in FIG. 5D represent the pixels subjected to the ink recording in the first main scanning and the second main scanning. Since the ink in the pixels subjected to the ink recording is dried. Therefore, the deformation in the print medium does not occur, even when the ink is recorded in the third main scanning.

When the main scanning is performed three times in this way, the recording of ink in the odd-numbered lines is completed. Therefore, subsequently, the recording of ink in the even-numbered lines is performed by transporting the print medium. In the even-numbered lines, the ink is also recorded in one line by performing the main scanning three times. Therefore, in the fourth main scanning (first main scanning in the even-numbered lines), the ink is recorded sequentially on 1, 4, 7, . . . , 1+3n-th pixels from the left side, as shown in FIG. 5E. In the fifth main scanning (second main scanning in the even-numbered lines), the ink is recorded on pixels right adjacent to the pixels subjected to the ink recording in the fourth main scanning. In addition, in the sixth main scanning (third main scanning in the even-numbered lines), the ink is recorded on pixels right adjacent to the pixels subjected to the ink recording in the fifth main scanning.

Since the dry printing according to this embodiment is performed by the record method described above, the control unit 20 rearranges the pixels in order of the printing in the odd-numbered lines and the even-numbered lines among the rearranged data in Step S120. In the example shown in FIGS. 5B to 5E, the image data on the odd-numbered lines are extracted from the unit print area R and the image data of the pixel obtained in n=0 to the image data of the 1+3n-th pixel are sequentially extracted to set the extracted data to the print data which are used in the first main scanning. Likewise, the image data of the pixel obtained in n=0 to the image data of the 2+3n-th pixel are sequentially extracted to set the extracted data to the print data which are used in the second main scanning. In addition, the image data of the pixel obtained in n=0 to the image data of the 3+3n-th pixel are sequentially extracted to set the extracted data to the print data which are used in the third main scanning. In addition, the image data on the even-numbered lines are extracted from the unit print area R and the image data of the pixel obtained in n=0 to the image data of the 1+3n-th pixel, to the image data of the 2+3n-th pixel, and to the image data of the 3+3n-th pixel are sequentially extracted to set the extracted image data to the print data which are used in the fourth main scanning, the fifth main scanning, and the sixth main scanning, respectively.

3. Other Embodiments

The embodiment described above is just an example of the invention. The invention may be modified in various forms, as long as an image can be formed by scanning the ink head and recording ink in the specific edge of the print medium more times than in the portion other than the specific edge. For example, a record method in the specific edge and the portion other than the specific edge is not limited to the method shown in FIGS. 5A to 5E. Specifically, the invention is applicable to a configuration in which both-direction printing performed in both directions of reciprocating motion in the main scanning or micro-weave printing of recording ink on pixels adjacent in the sub-scanning through different nozzles is performed.

When the deformation in the portion other than the specific edge occurs upon performing printing by an arbitrary record method such as the both-side printing or the micro-weave printing in the portion other than the specific edge, the record method is modified so that the scanning in the specific edge is performed more times than in the portion other than the specific edge. The number of main scanning in the specific edge is not particularly limited, but various methods such as a method of recording ink on the first pixels from the left side in the first main scanning and recording ink on the fourth pixels from the left side in FIG. 5B in the second main scanning may be used shown.

In the embodiment described above, the size of the specific edge $P_E$ is determined on the basis of the distance L between the transport rollers 415*a* and 415*b* and the transport rollers 410*a* and 410*b*. Of course, when the failure in transporting the print medium occurs in another transport roller other than the transport rollers 415*a* and 415*b* and the transport rollers 410*a* and 410*b*, the size of the specific edge $P_E$ may be determined on the basis of the another transport roller. For example, the size of the specific edge $P_E$ may be determined by setting the longest distance among distances of the transport rollers parallel in a direction of the transport passage of the print medium to the distance from the side E of the print medium.

In the embodiment described above, the specific edge is an edge including the shorter side of the print medium. However, the specific edge may be an edge including the longer side of the print medium. That is, when the transport passage in which the print medium is transported to the print medium reversing unit so that the longer side of the print medium becomes the lead side is configured, the edge including the longer side of the print medium which serves as the lead side in the transport is set to the specific edge.

In the embodiment described above, various main processes such as the color conversion or the rearrangement are performed in the printing apparatus 10. Of course, one or a combination of the image adjuster 21*a*, the color conversion processor 21*b*, the halftone processor 21*c*, and the rearrangement processor 21*d* (the image data acquiring portion 21*d*1, the print data generator 21*d*2, and the print controller 21*d*3) is executed in the computer and then the remaining processes may be performed in the printing apparatus 10.

The configuration of the print medium reversing unit 41*a* shown in FIG. 2 is just an example and various configurations may be employed. A relation between the ink ejection area and the transport rollers 415*a* and 415*b* is not limited to the configuration shown in FIG. 2, but the transport rollers 415*a* and 415*b* may be located on a more downstream side (a discharging side of the print medium) of the transport passage of the print medium than the ink ejection area (which is a location of the ink head 43). Of course, the configuration for reversing the print medium may be modified in various forms and the print medium may be reversed on a more downstream side than the ink ejection area.

In the embodiment described above, since it is assumed that the print medium is discharged after the rear surface of the print medium is printed, the dry printing is not performed on the rear surface. Of course, when the print medium is deformed upon performing the printing on the rear surface and thus the transport failure occur, the dry printing may also be applied on the rear surface.

In the embodiment described above, the print data corresponding to one page are generated for performing the normal printing and the rearrangement is performed when the print location is the specific edge. Of course, the print data for performing the normal printing on the portion other than the specific edge in advance and performing the dry printing on the specific edge may be generated in advance.

In the dry printing, a configuration for suppressing the use amount of ink may be employed in addition to the configuration for adjusting the number of scanning of the ink head 43. For example, an image may be formed by allowing an upper limit of the amount of ink used per unit area to be smaller in the specific edge $P_E$ than in the portion other than the specific edge $P_E$. For example, in a configuration in which the state of recording one ink droplet in all grids, as shown in FIG. 5A, is set as the upper limit of the use amount of ink in the normal printing, it is configured that the deformation in the print medium does not occur even when the ink is recorded up to the upper limit, by allowing the upper limit of the use amount of ink in the specific edge to be smaller. With such a configuration, it is possible to more reliably prevent the deformation in the specific edge of the print medium.

Figure 6:
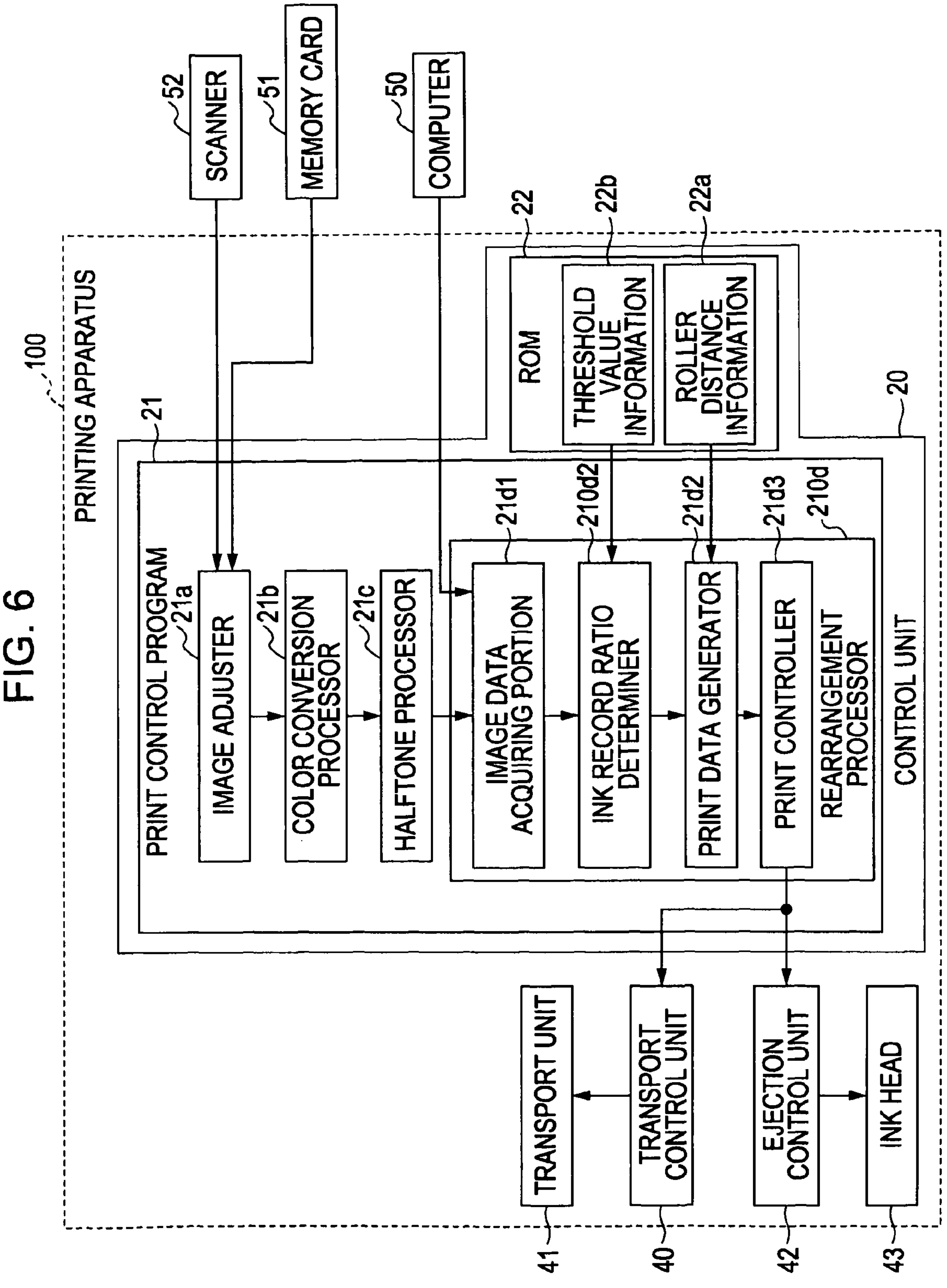
FIG. 6 is a block diagram illustrating the configuration of a printing apparatus.
Figure 7:
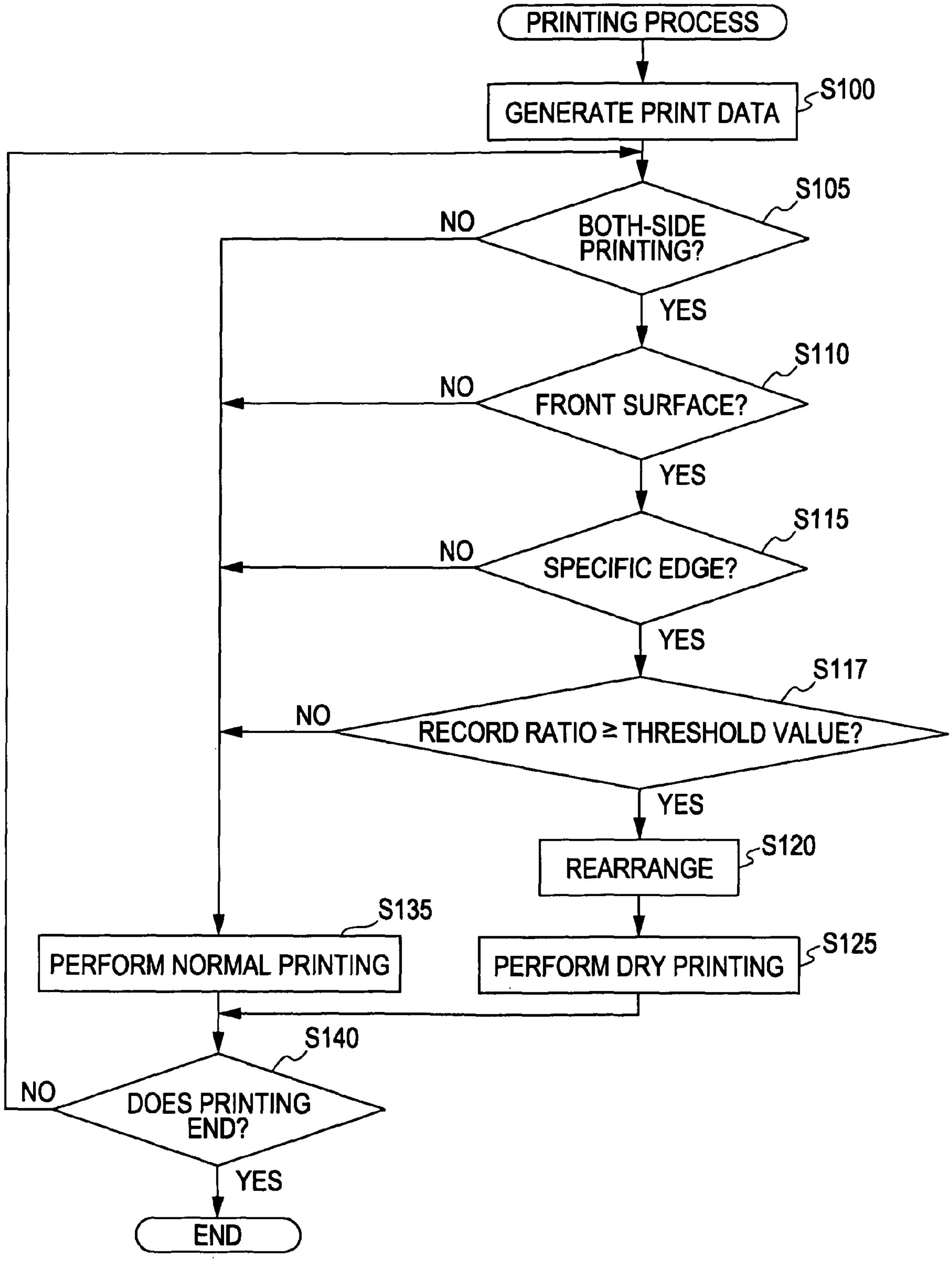
FIG. 7 is a flowchart illustrating a printing process.

The deformation in the print medium occurs when a record ratio of ink with respect to the print medium is relatively high. Therefore, the print medium may be transported appropriately, by preventing the deformation in the print medium in accordance with details of an image. FIG. 6 is a block diagram illustrating a printing apparatus preventing the deformation such as curl of the print medium in accordance with the details of an image. FIG. 7 is a flowchart illustrating a printing process performed by the printing apparatus. The configuration is realized by modifying a part of the configuration shown in FIGS. 1 and 2. In FIGS. 6 and 7, different reference numerals are given to constituent elements different from those shown in FIGS. 1 and 2. That is, in a printing apparatus 100 shown in FIG. 6, the configuration of a rearrangement processor 210*d* is different from the configuration shown in FIG. 1. That is, there is provided an ink record ratio determiner 210*d*2 which determines an ink record ratio during the process of the image data processor 21*d*1 and the process of the print data generator 21*d*2.

In this embodiment, on the basis of a number Pa of pixels forming a unit print area and a number Pi of pixels in which ink is recorded in the unit print area when the deformation in the print medium occurs, a threshold value for the ink record ratio is defined to Pi/Pa. In addition, threshold value information 22*b* indicating a threshold value is stored in the ROM. When the ink record ratio for the specific edge $P_E$, which may be a cause of the transport failure, exceeds a predetermined threshold value in printing with reference to the threshold value information 22*b*, the image is formed by scanning the ink head 43 and recording ink in the specific edge $P_E$ more times than in the portion other than the specific edge $P_E$.

The ink record ratio determiner 210*d*2 is a module which determines whether the ink record ratio in the specific edge $P_E$ exceeds a predetermined threshold value on the basis of the image data subjected to the halftone process. In this embodiment, the image data indicating pixels of the unit print area is acquired from the image data of an image to be printed in the specific edge $P_E$ and the ink record ratio in the unit print area is acquired. In addition, when the ink record ratio exceeds the predetermined threshold value, it is assumed that the deformation in the print medium occurs.

In the normal printing according to this embodiment, the printing can be completed in a short time by sequentially recording ink on the adjacent pixels without forming an interval in grids forming the pixels. However, when an image having a high ink record density is printed in the record method of completing the printing in a short time, subsequent ink is recorded before dryness of ink recorded on the print medium. Accordingly, the deformation in the print medium may occur, thereby creating the cause of the transport failure upon transporting the print medium to the print medium reversing unit 41*a*. In order to solve this problem, in this embodiment, the dry printing is performed so as not to create the cause of the failure in transporting the print medium, when the ink record ratio in the specific edge $P_E$ described above exceeds to the predetermined threshold value under the print condition that printing is performed on the rear surface after printing on the front surface.

Figure 4:
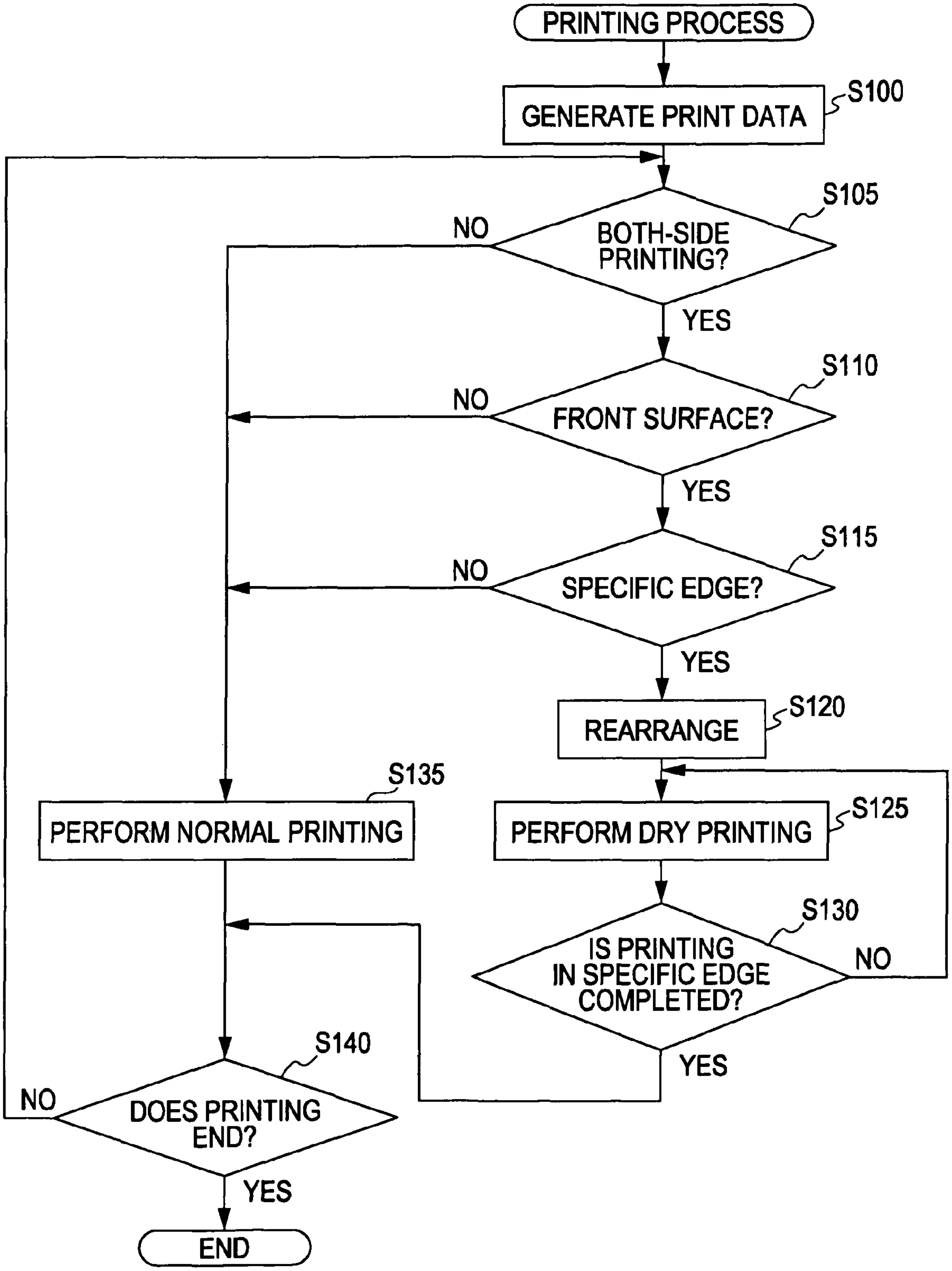
FIG. 4 is a flowchart illustrating a printing process.

The printing process in FIG. 7 is almost the same as the printing process in FIG. 4. Step S117 is performed between Steps S115 and S120 and Step S130 is omitted. In addition, Step S140 is performed after Step S125. That is, when it is determined that a portion as the present print target is the specific edge $P_E$ in Step S115, it is determined whether the ink record ratio in the specific edge $P_E$ exceeds the predetermined threshold value in Step S117.

In the determination of Step S117, the control unit 20 acquires the ink record ratio in the unit print area.

Figure 8:
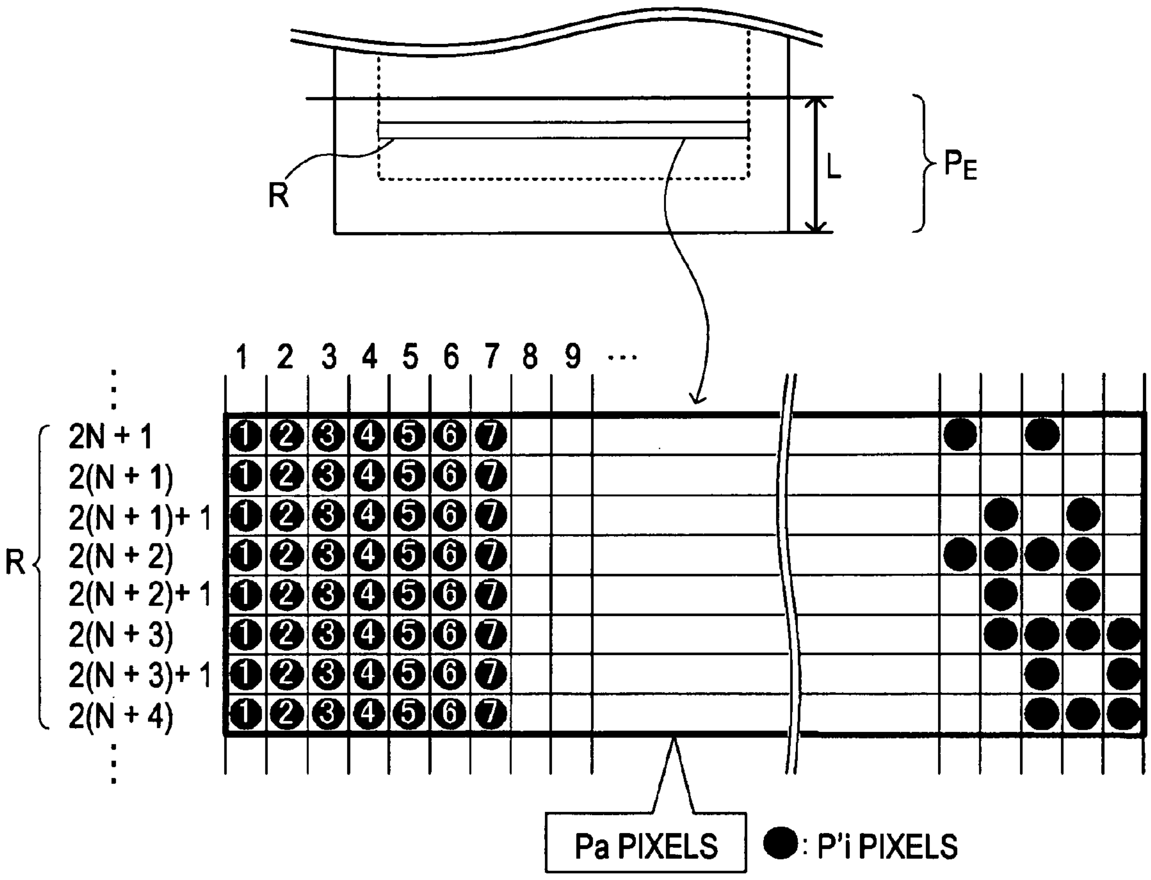
FIG. 8 is an explanatory diagram illustrating an ink record ratio and an ink record sequence.

FIG. 8 is an explanatory diagram illustrating an example of the process of acquiring the ink record ratio. In FIG. 8, a unit print area R included in the specific edge $P_E$ of the print medium shown in FIG. 3 is expanded. In the expanded view (a rectangular shape indicated by a thick line in FIG. 8), pixels are indicated by grids and an ink droplet recorded in each of pixels is indicated by the black circle in a grid. In the drawing, right and left directions are a main scanning direction and upper and lower directions are a sub-scanning direction. First to ninth numbers are given to several pixels from the left end in the main scanning direction and 2N+1-th to 2(N+4)-th numbers (where n is 0 or a natural number) are given to lines parallel in the sub-scanning direction.

In this example, the number of pixels forming the unit print area is Pa. By referring the image data subjected to the halftone process, it can be determined whether the ink is recorded in each of pixels. The control unit 20 acquires the number P'i of pixels in which the ink is recorded on the basis of the image data. The control unit 20 acquires the threshold value Pi/Pa with reference to the threshold value information 22*b*. By acquiring an ink record ratio P'i/Pa in the unit print area and comparing with the threshold value Pi/Pa described above, it is determined whether the ink record ratio in the specific edge $P_E$ exceeds the predetermined threshold value.

When it is determined that the ink record ratio in the specific edge $P_E$ exceeds the predetermined threshold value in Step S117, the dry printing is performed in Steps S120 and S125. When the dry printing in the unit print area ends in Step S125, processes subsequent to Step S140 proceed. Alternatively, when it is determined that the ink record ratio in the specific edge $P_E$ does not exceed the predetermined threshold value in Step S117, the normal printing is performed in Step S135. That is, the printing in the unit print area is performed on the basis of the print data generated in Step S100.

According to the processes described above, the dry printing is performed, when the ink is recorded at the ink record ratio at which the print medium can be deformed in the specific edge $P_E$ of the front surface of the print medium. However, the dry printing is not performed, when the ink is not recorded at the ink record ratio obtained when the print medium is deformed. In this way, it is possible to perform the process of preventing the deformation in the print medium, if necessary.

Next, detailed examples of the normal printing and the dry printing will be described with reference to the expanded view of FIG. 8 and FIGS. 5B to 5E according to this embodiment. In the expanded view of FIG. 8, an ink record sequence in the normal printing is exemplified by the left grids. The ink record sequence in the dry printing is the same as that in FIGS. 5B to 5E. The numbers in the black circles on the left side in the expanded view of FIG. 8 indicate the ink record sequence during the same main scanning. In addition, in the drawings, a state where the ink is recorded in the pixels in accordance with the ink record sequence of the pixels is indicated by the black circles. Of course, pixels in which the ink is not recorded may be present in actual printing, as indicated in the right grids of the expanded view, for example.

In this embodiment, the printing is performed by a record method of completing the ink recording in a short time as soon as possible, the ink is sequentially recorded on the pixels adjacent to each other in the main scanning direction, and the ink is simultaneously recorded on plural pixels adjacent to each other in the sub-scanning direction. Accordingly, the normal printing shown in the expanded view of FIG. 8 is performed in the same manner as that in FIG. 5A described above. In the normal printing, the print medium may be deformed, thereby creating the cause of the transport failure upon transporting the print medium to the print medium reversing unit 41*a*.

On the other hand, in the dry printing, the dryness of the ink can be accelerated by performing the main scanning more times than in the normal printing and completing the printing corresponding to one line, when the ink record ratio exceeds the predetermined threshold value. For example, in order to complete the printing corresponding to one line, the main scanning is performed three times and the ink is recorded in every two pixels in the sub-scanning direction. In this example, the unit print area R shown in FIG. 8 is scanned by total six-time main scanning and one-time sub-scanning, when first main scanning to third main scanning are performed on odd-numbered lines and fourth main scanning to sixth main scanning are performed on even-numbered lines. That is, when the printing is performed in the order shown in FIGS. 5B to 5E, the dry printing can be performed. Since the dry printing according to this embodiment is performed by the above-described record method, the control unit 20 rearranges the pixels in order of the printing in the odd-numbered lines and the even-numbered lines among the rearranged data in Step S120.

In the embodiment described above, since the ink record ratio in the unit print area is acquired, the length of the area where the ink record ratio is analyzed in a direction perpendicular to the transport direction of the print medium is the same as the length of the entire scanning range. However, another configuration may be employed. For example, the length of the area where the ink record ratio is analyzed in the direction perpendicular to the transport direction of the print medium may be a length of a substantial scanning range in the direction perpendicular to the transport direction of the print medium. Here, the substantial scanning range is an area excluding pixels in which the ink is not recorded in both ends of the scanning range. For example, when the ink is not recorded up to a fifth pixel from the left side in the unit print area, the ink is not recorded in pixels on the right side of an x-th pixel from the left side, and the ink is recorded in pixels between the sixth pixel and an (x−1)-th pixel, a range between the sixth pixel and the (x−1)-th pixel is the substantial scanning range.

Figure 9:
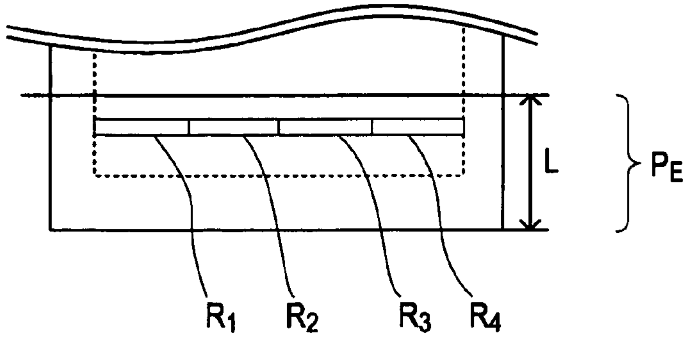
FIG. 9 is an explanatory diagram illustrating the configuration for dividing a unit print area and determining the ink record ratio.

An area formed by dividing a scanning range in the specific edge in the direction perpendicular to the transport direction of the print medium may be configured as the area of a target for determining the ink record ratio. FIG. 9 shows that the unit print area included in the specific edge $P_E$ of the print medium is equally divided into four $R_1$ to $R_4$ areas. In this way, when the unit print area is divided and a threshold value of the ink record ratio is set for each of the divided areas, it can be determined whether deformation occurs in each of the divided areas by comparison with a threshold value, by acquiring the ink record ratio of each of the divided areas on the basis of the image data subjected to the halftone process. That is, it can be determined whether the cause of the transport failure occurs due to regional deformation in the print medium.

The areas obtained by dividing the scanning range in the direction perpendicular to the transport direction of the print medium may correspond to an area where the regional deformation in the print medium has to be prevented. In addition, the areas may be divided equally or unequally. The comparison between the ink record ratio and the threshold value is performed in at least one of the divided areas. For example, when the unit print area R described above is divided into four areas, the comparison between the ink record ratio and the threshold value may be performed in two areas ($R_1$ and $R_4$) in the both end.

The threshold value described above may be different in each of the divided areas. For example, the threshold value may become smaller as the divided area is closer to the end in the direction perpendicular to the transport direction of the print medium. Alternatively, the threshold value may become smaller as the divided area is located in a position serving as an important role of preventing the failure in transporting the print medium. Specifically, when a relation of a threshold value of the area $R_1$<a threshold value of the area $R_2$ is satisfied, a possibility that the print medium is deformed in the area $R_1$ can be examined in more detail than in the area $R_2$.

When the size of the divided areas is configured to be different, the size of the divided area becomes smaller as the divided area is closer to the end in the direction perpendicular to the transport direction of the print medium. Alternatively, the size of the divided area becomes smaller as the divided area is located in a position serving as an important role of preventing the failure in transporting the print medium. Specifically, when the relation of the size of the area $R_1$<the size of the area $R_2$ is satisfied in a case where the threshold values of the divided areas are the same as each other, the possibility that the print medium is deformed in the area $R_1$ can be examined in more detail than in the area $R_2$.

What is claimed is:

1. A printing apparatus comprising:

an image data acquiring unit which acquires image data representing an image of a print target;

a print data generating unit which generates print data based on the image data, the print data allowing an ink head to scan and record ink in a specific edge of a print medium more times than in a portion other than the specific edge, wherein the specific edge is an area having a predetermined length from a side which is a lead side of the print medium upon transporting the print medium to a print medium reversing unit included in the printing apparatus and wherein the predetermined length is a distance between a first roller for transporting the print medium in the print medium reversing unit and a second roller for transporting the print medium toward the first roller; and a print control unit which prints the image by controlling an ink head based on the print data.

2. The printing apparatus according to claim 1, wherein the print data generating unit generates the print data for forming the image by allowing an upper limit of an amount of ink used per unit area to be smaller in the specific edge than in the portion other than the specific edge.

3. The printing apparatus according to claim 1, wherein the image data acquiring unit acquires the image data defining an amount of ink used in each of pixels in order of the pixels in which the ink is recorded, and wherein the print data generating unit generates the print data by changing an ink record sequence for pixels corresponding to the specific edge.

4. The printing apparatus according to claim 1, further comprising:

an ink record ratio determining unit which determines whether an ink record ratio in the specific edge exceeds a predetermined threshold value on the basis of the image data, wherein the print data generating unit generates the print data when the ink record ratio exceeds the predetermined threshold value.

5. The printing apparatus according to claim 4, wherein the ink record ratio determining unit determines whether the ink record ratio in an area included in the specific edge and having a predetermined length in a direction perpendicular to a transport direction of the print medium exceeds a predetermined threshold value.

6. The printing apparatus according to claim 4, wherein the ink record ratio determining unit determines whether the ink record ratio in an area formed by dividing a scanning range in the specific edge in a direction perpendicular to a transport direction of the print medium exceeds a predetermined threshold value.

7. The printing apparatus according to claim 6, wherein the predetermined threshold value is a value which becomes smaller as the divided area is closer to an end portion in the direction perpendicular to the transport direction of the print medium.

8. The printing apparatus according to claim 6, wherein a size of the divided area becomes smaller as the divided area is closer to an end portion in the direction perpendicular to the transport direction of the print medium.

* * * * *